June 23, 1925.

T. KURRELL ET AL

COOKING STOVE

Filed April 12, 1924      2 Sheets-Sheet 2

1,543,212

INVENTORS
Theodore Kurrell
Heinrich Schneider
John U. Fischer
By
ATTORNEYS

Patented June 23, 1925.

1,543,212

UNITED STATES PATENT OFFICE.

THEODORE KURRELL, HEINRICH SCHNEIDER, AND JOHN U. FISCHER, OF SAN FRANCISCO, CALIFORNIA.

COOKING STOVE.

Application filed April 12, 1924. Serial No. 706,077.

*To all whom it may concern:*

Be it known that we, THEODORE KURRELL, HEINRICH SCHNEIDER, and JOHN U. FISCHER, citizens of the Republic of Lettland, Austria, and the United States of America, respectively, residing at San Francisco, county of San Francisco, and State of California, have invented new and useful Improvements in Cooking Stoves, of which the following is a specification.

The present invention relates to a novel cooking stove and resides in the provision of a stove which will provide for a quicker, better and more economical cooking of food than the ordinary stove, there being a rotary heating member disposed above the cooking plate and heated in a novel manner so that a frying pan or other cooking vessel placed on the heated plate beneath said heating member will provide for the cooking of the contents thereof in a more expeditious and better manner.

An object of the invention is to provide a stove of the character described in which provision is made for keeping cooked foods warm with a specially constructed warming arrangement including stationary shelves and revolving heating elements or plates disposed above the shelves so that receptacles containing foods placed on the shelves will be kept warm from the heat given off by said heating plates.

Another object of the invention is to provide a cooking stove of the character described which will be small, compact and inexpensive to operate and yet provide for the cooking of a greater number of different dishes or foods than is possible with the ordinary stove, the cooking heat being so distributed that a better and more uniform cooking of the foods is provided, and making it unnecessary to "turn" the food in the cooking vessel.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

Referring to the drawings.

Figure 1:
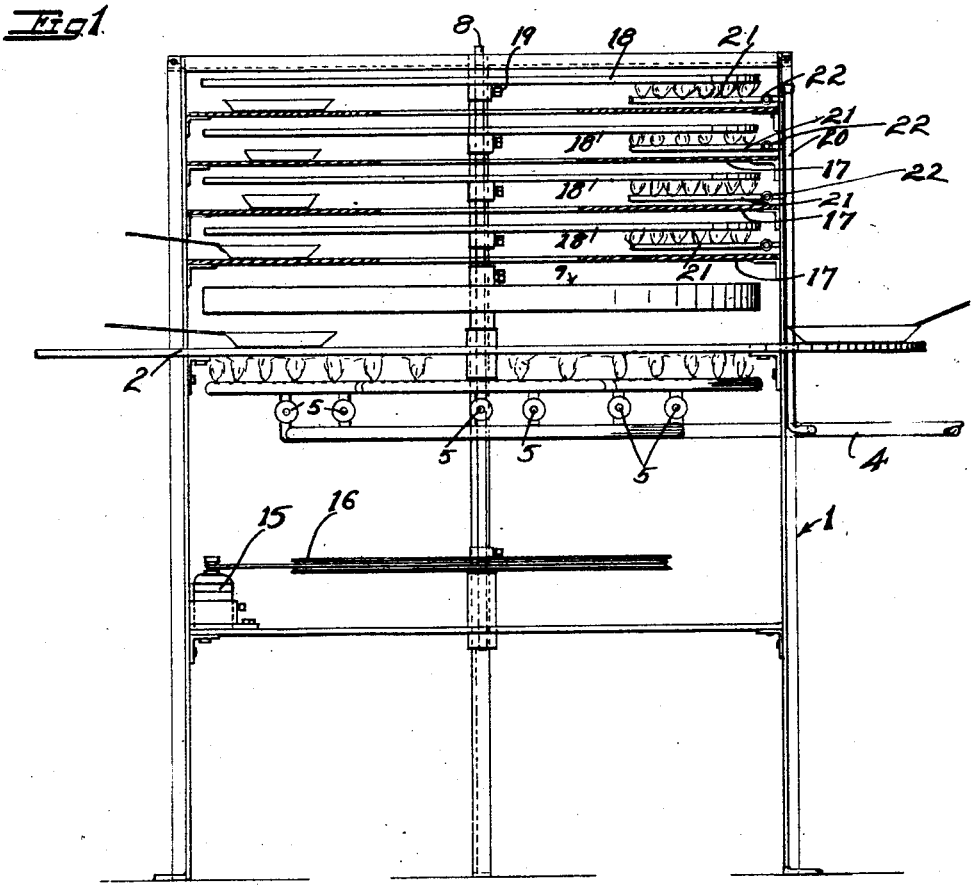
Fig. 1 represents a side elevation of the stove of our invention, showing parts in section.
Figure 2:
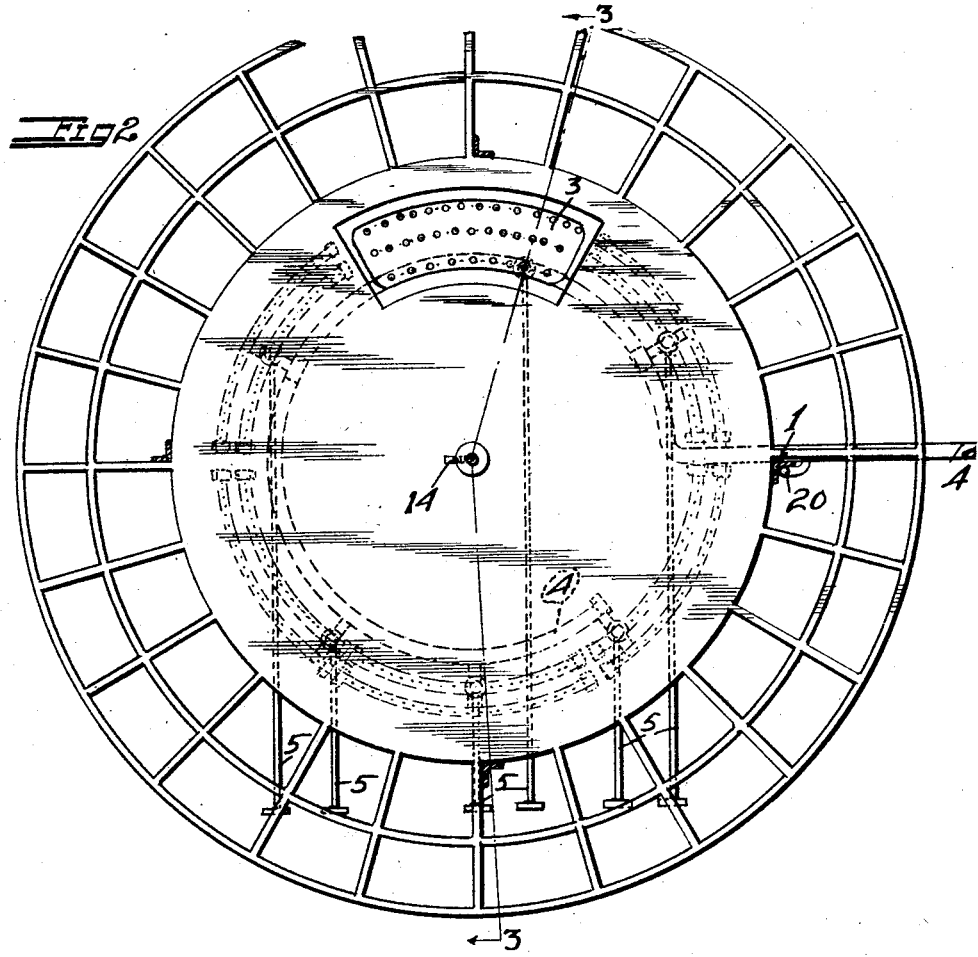
Fig. 2 represents a top plan view of the stove with the warming arrangement removed.
Figure 3:
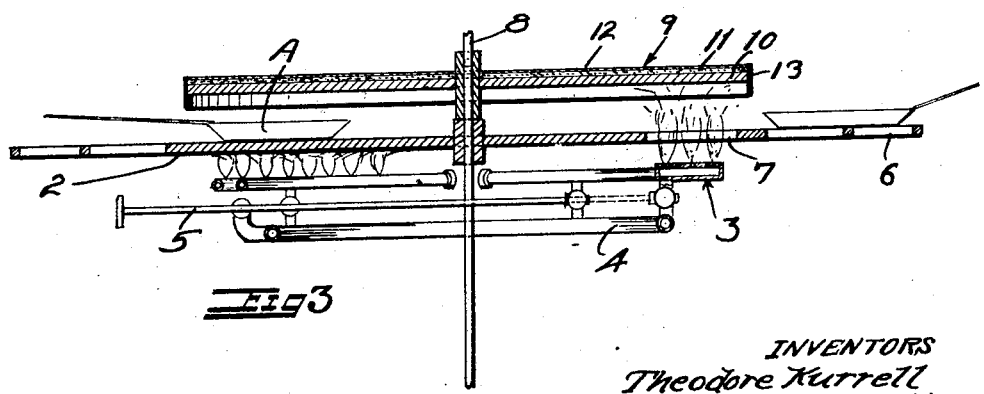
Fig. 3 represents a sectional view taken on the plane of line 3—3 of Fig. 2.

The embodiment of the invention shown in the accompanying drawings comprises essentially a stand 1 supporting a cooking plate 2, in this instance of circular form, beneath which cooking plate suitably supported by the stand, is an annular arrangement of arcuate gaseous fuel burners 3 located adjacent the periphery of the plate and being supplied by a main feed pipe 4, leading from a source of fuel supply, not shown. The arcuate or segmental burners are each provided with a valve 5 and are so arranged that each burner will heat a section or segment of the circular cooking plate, of sufficient area to provide for supporting a cooking vessel or pan, as shown at A. In this way, a plurality of cooking vessels may be mounted on the cooking plate so that a number of foods may be cooked at the same time.

Extending from the periphery of the plate 2 is an annular grilled supporting shelf 6, on which cooking vessels and other utensils may be placed to one side of the cooking or heating spaces of the plate.

One of the burners is disposed beneath an arcuate opening 7 in the plate 2 whereby the flames from said burner will be directed above the cooking plate, said opening being for example, substantially equal in length to one-sixth of the circumference of the plate but may be larger or smaller as desired.

Vertically adjustably mounted on an upright shaft 8 supported in the stand and extending through the center of the plate 2 is a rotary circular heating member 9 so arranged that the flames from the burner beneath the opening 7 will impinge against its under side. This member is made up of a comparatively thick iron plate 10 having an asbestos sheet 11 on its upper side. On top of the sheet of asbestos is a thin metal sheet 12 and surrounding these plates or sheets is a band 13 which projects below the under surface of the iron plate 10 and serves as a heat retaining flange. By means of a set screw 14, the member 9 may be vertically adjusted on the shaft 8 to regulate the spacing thereof relative to the cooking plate 2. Preferably the spacing of these elements is such that a frying pan or like vessel may be conveniently inserted between said plate and member, it being desirable to dispose said vessel as close as possible to the cooking plate 2 in order that the heat from the member will be directed onto the food being cooked. The flames from the burner beneath the opening 7 in being directed onto the iron plate 10 of the member 9 while said member 9 is rotating, will effectively heat said plate so that the heat will be directed onto the food disposed in the one or more cooking vessels. The member 9 is rotated slowly by any suitable arrangement, for example, the motor 15, and belt and pulley arrangement 16.

The stand 1 extends above the plate 2 and supports a plurality of annular shelves 17, which shelves are spaced one above the other and have interposed between them a plurality of circular heating disks 18, which disks are vertically adjustably mounted on the shaft 8, being held in adjustment by set screws 19. The circular heating disks 18 are spaced above the shelves sufficiently to permit the insertion of dishes or pans containing food to be kept warm onto the shelves 17. The disks are arranged to extend over and close to said dishes or receptacles containing the foods so that the heat from said disks will serve to keep the dishes and contents warm. Extending upwardly from the fuel supply pipe 4 along one of the members of the stand 1, is a fuel supply pipe 20, laterally from which a plurality of burners 21 extend, said burners being disposed between the shelves and disks so as to heat the under sides of said disks. Each burner is provided with a valve 22 but only a small flame is required at the burners 21 to heat said disks sufficiently to maintain the dishes and contents warm. By having these circular spaces open along their outer side, it is possible to approach the shelves from various points around the circumference of the stove and to easily insert dishes and like receptacles so that the food contained in said dishes may be kept warm.

With the stove set up as shown in the drawings, if it is desired to cook in one vessel only, the food to be cooked is placed in a pan or like vessel as shown at A, and may be supported on the grilled shelf 6 before being moved into position to be cooked. Selecting one of the segmental burners 3, the operator lights this burner and also the burner opposite the opening 7 in the cooking plate. The heat from the first named burner heats a section over the cooking plate on which heating section the cooking vessel is placed, the other burner heats the member 9 so that the heat is directed onto the upper side of the food in the receptacle A. In cooking steaks and other foods of similar nature, it is not necessary to turn the food to cook one side and then the other as is customary inasmuch as the heat from the member 10 provides for cooking the upper side of the food while the heat from the burner beneath the plate 2 provides for cooking the other side. It will thus be seen that food may be cooked in a much more expeditious manner than with the ordinary stove and that the flavor of the food will be improved, due to the more even cooking provided for through this special distribution of the heat.

The asbestos sheet 11 prevents heat retained by the plate 11 from being dissipated upwardly and the flange 13 acts to retain the heat beneath the member 9. This member 9 is set to rotate slowly and in so doing is caused to be heated sufficiently throughout so that one or more cooking operations may be carried out as desired. When one or more cooking operations is to be effected, the other burners of the series are lighted as needed it being possible with the apparatus shown to simultaneously heat five separate areas of the cooking plate and to thereby place as many or more cooking vessels on said areas.

We have found that food may be cooked with the stove of this invention in less time than is required with the ordinary stove, particularly in frying and broiling. A steak broiled or fried with the stove of this invention is improved as to flavor as compared to one which has to be turned over during the cooking operation as on the ordinary stove. This is also true of other foods which must be fried or broiled where a quick and even heat application and a quick cooking thereof is most desirable.

Certain foods which may be cooked slowly may be cooked on the warming shelves with the arrangement located above the cooking members 2 and 9, the heat from the disks 18 being sufficient for this purpose.

With reference to the foregoing description and accompanying drawings, it will be seen that the stove of this invention may be made up in a small, compact form and yet provide for simultaneous carrying out of a greater number of cooking operations in a more expeditious and satisfactory manner than is possible with the ordinary stove and that an inexpensive and reliable means is provided for keeping foods warm or for slowly cooking foods through the warming arrangement at the upper side of the stove. In having the stove of circular form, it is better adapted for being placed behind lunch counters and in fact, in all kitchens, so that it may be approached from any side and operated as desired. By having the cooking top 2 solid instead of grilled, or provided with openings except for the main opening 7, the heat is confined beneath said top so that the heat from the member 9 as derived from the one burner, will not be greater than the heat provided on the plate 2, it being desirable to provide for a substantially uniform heat in the two cooking members so that the upper and lower sides of the food will be cooked simultaneously and uniformly.

We claim:

1. A cooking stove comprising a stand, a stationary cooking plate supported by the stand, a burner beneath the cooking plate, said plate having an opening therein, a burner beneath said opening arranged to direct flames above the plate and a revolvable heating member mounted above and in upwardly spaced relation to said plate in position to have the flames from the second named burner directed against the under side thereof, the cooking being done between the plate and revolvable heating member.

2. A cooking stove comprising a stand, a stationary cooking plate on the stand on which cooking is done, a revolvable cooking member mounted above said plate and a burner directing flames on the under side of said member.

3. A cooking stove comprising a stand, a stationary cooking plate on the stand on which plate the cooking is done, a burner beneath said cooking plate, a revolvable cooking member vertically adjustably mounted above said plate and a burner directing flames on the under side of said member.

4. A cooking stove comprising a stand, a stationary cooking plate supported by the stand and having an opening therein, a plurality of burners arranged beneath and adapted to heat sections of said plate, a burner mounted beneath said opening and adapted to direct flames through the opening and above the plate and a revolvable heating member sufficiently spaced above the plate to admit of the insertion of cooking vessels between said plate and member.

5. A cooking stove comprising a stand, a stationary cooking plate supported by the stand, a burner mounted beneath said cooking plate, a revolvable heating member sufficiently spaced above the cooking plate to permit of the insertion of a cooking vessel between said plate and member and a burner arranged so that the flames thereof will be directed onto said heating member and means for revolving said heating member.

6. A cooking stove comprising a stand, a stationary cooking plate mounted on the stand, means beneath the upper surface of said plate for providing a cooking heat at said upper surface, a revolvable heating member spaced above the cooking plate to permit of the insertion of a cooking vessel between it and said plate and means for heating and causing heat from said heating member to be directed downwardly therefrom.

7. A cooking stove comprising a stand, a stationary cooking plate mounted on the stand, means beneath the upper surface of said plate for providing a cooking heat at said upper surface, a revolvable heating member spaced above the cooking plate to permit of the insertion of a cooking vessel between it and said plate, means for heating and causing heat from said heating member to be directed downwardly therefrom, a plurality of shelves spaced above said cooking plate, a plurality of heating members revolvably mounted above and between said shelves and means for heating the under sides of said members.

8. A cooking stove comprising a stand, a stationary heating plate mounted on the stand, a burner mounted beneath said heating plate, a revolvable heating member spaced above said plate sufficiently to permit of the insertion of cooking vessels between it and said plate, a burner arranged to direct flames against the under side of said heating member, a stationary shelf mounted above said heating member, another heating member revolvably mounted above said shaft and spaced sufficiently therefrom to permit of the insertion of a receptacle between said members and means for heating the under side of said second named heating member.

9. A cooking stove comprising a frame, a stand, a stationary circular cooking plate mounted on said stand, a plurality of burners mounted beneath said plate, said plate having an arcuate opening therein, a burner mounted beneath said opening and arranged to direct flames through the opening above said plate, a circular heating member rotatably mounted above said plate and being spaced therefrom sufficiently to permit of the insertion of cooking vessels between it and the plate, the flames from the last named burner impinging against the under side of said heating member and a circular grid extending outwardly from the periphery of said plate beyond the edge of the heating member.

10. A cooking stove comprising a frame, a stand, a stationary circular cooking plate mounted on said stand, a plurality of burners mounted beneath said plate, said plate having an arcuate opening therein, a burner mounted beneath said opening and arranged to direct flames through the opening above said plate, a circular heating member rotatably mounted above said plate and being spaced therefrom sufficiently to permit of the insertion of cooking vessels between it and the plate, the flames from the last named burner impinging against the under side of said heating member, a circular grid extending outwardly from the periphery of said plate beyond the edge of the heating member, a shaft extending above said heating member, a second heating member mounted upon said shaft, means for rotating said heating member and means for heating the second named heating member.

THEODORE KURRELL.
JOHN U. FISCHER.
HEINRICH SCHNEIDER.